April 7, 1942.  F. M. THUL  2,278,681
SAFETY WINCH
Filed May 15, 1941
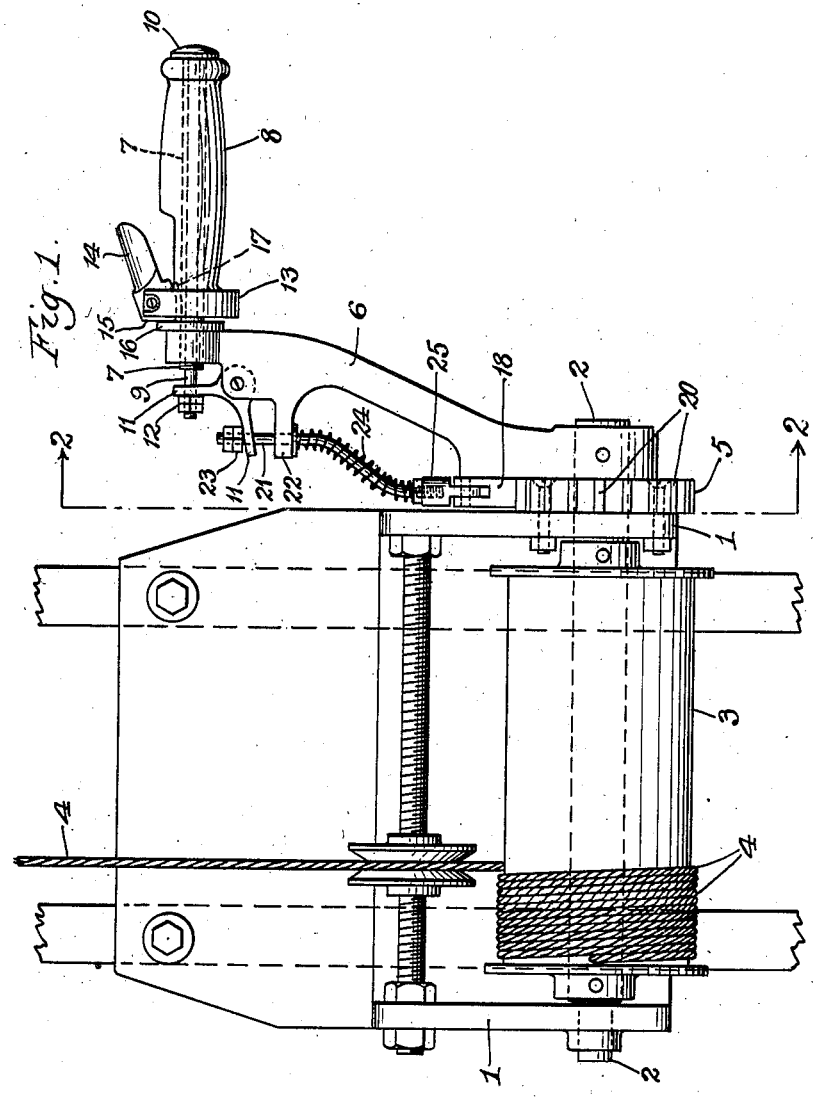
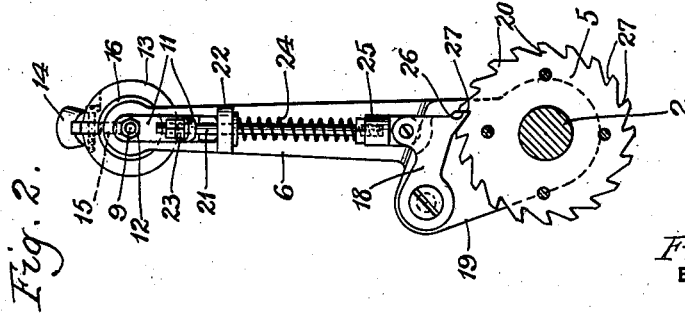
INVENTOR
Frank M. Thul.
BY Parker Carter
ATTORNEYS.

Patented Apr. 7, 1942

2,278,681

UNITED STATES PATENT OFFICE 2,278,681

SAFETY WINCH

Frank M. Thul, Davenport, Iowa

Application May 15, 1941, Serial No. 393,500

4 Claims. (Cl. 254—186)

This invention relates to an improvement in safety winches and the like, and has for one object to provide a safety, hand operated hoisting winch, wherein substantially all of the moving elements comprising the safety interlocking means are mounted on and rotate with the hand crank, and wherein the only fixed element is a ratchet-like abutment fixed on the supporting frame and adapted always to be so arranged within the path of the moving members that only a minimum excursion of the crank is permitted if the operator loses control of it.

Another object of the invention is to provide a safety winch wherein lateral movement of the handle with respect to the crank, subject to the tension exerted by the operator, is sufficient to disengage the safety latch, and wherein additional means actuated by the grip of the hand of the operator on the handle assists in such longitudinal displacement.

Other objects of the invention will appear from time to time in the specification and claims.

This invention is illustrated more or less diagrammatically in the accompanying drawing, wherein Figure 1 is a side elevation;

Figure 2 is a section along the line 2—2 of Figure 1.

Like parts are indicated by like characters throughout the specification and drawings.

1 is a rigid supporting frame. 2 is a drum shaft mounted for rotation in the frame. 3 is a winch drum held against rotation on the shaft and adapted to have wound about it a hoisting cable 4. 5 is a fixed locking ratchet mounted on the shaft 2. 6 is a crank rigidly mounted on the shaft 2. 7 is a crank handle spindle rigidly mounted on the crank 6. 8 is a crank handle slidably and rotatably mounted on the spindle 7. 9 is a crank handle pull rod extending longitudinally through the hollow crank handle spindle, and having an enlarged head 10 engaging the outer end of the handle 8 whereby the pull rod may be longitudinally displaced by longitudinal displacement of the crank handle on the spindle 7. The pull rod 9 extends through the crank and through one end of a bell crank lever 11 which is pivoted on the crank 6. A nut 12 on the end of the pull rod causes angular movement of the bell crank lever in consonance with longitudinal displacement of the crank handle.

13 is a collar on the end of the handle 8 nearest the crank 6. Pivoted on this collar is a thumb piece 14, on the other end of which is a cam member 15 engaging a ball bearing thrust collar 16 which may be rigid on the crank 6. The handle is cut away at 17 to provide clearance for the thumb piece. 18 is a dog pivoted on the integral crank extension 19. This dog is adapted to engage the ratchet teeth 20 on the locking ratchet 5. 21 is a connecting rod leading from the outermost end of the dog 18 passing through a guide lug 22 on the crank 6, and passing then through the other end of the bell crank lever 11. A nut 23 on the end of the connecting rod permits angular movement of the bell crank lever 11 to lift up on the connecting rod 21 and raise the dog out of engagement with the locking ratchet 5. 24 is a spring encircling the connecting rod 21, abutting at one end on a shoulder 25 on the connecting rod 21 and at the other end on the guide lug 22, the strength of the spring being such that it forces the dog 18 into engagement with the locking ratchet whenever the hand of the operator is removed from the crank handle 8 and thumb piece 14.

The dog 18 and the teeth of the locking ratchet 5, have mating holding surfaces 26, 27, respectively, which are inclined to a radius intersecting the holding surfaces. In other words, the ratchet teeth are undercut and the dog matches that undercut so that when the dog engages the ratchet there is a strong tendency for rotation of the drum to force the tooth and dog into further and more effective engagement.

It will be realized that while I have shown my device more or less diagrammatically in the drawing, still many changes might be made in the size, shape, number, arrangement and disposition of parts without departing materially from the spirit of the invention. Therefore, it is desired that the showing be taken as in a large sense diagrammatic.

The use and operation of this invention are as follows:

Starting with a load on the cable, the drum will be held against rotation by the engagement of the ratchet tooth and the dog which locks the handle against movement in the downward direction and holds the load. When the operator wishes to operate the winch he takes hold of the handle and rotates the crank in a direction against the load. This releases the pressure between the dog and the ratchet. He exerts a pressure on the thumb piece to cause the cam to exert pressure on the fixed collar on the crank displacing the rotatable handle longitudinally. He then may wind up or down as the case may be.

If for any reason the operator should let go of the handle the spring will at once force the dog inwardly to cause it to interlock with the locking ratchet to prevent rotation of the crank.

Since there are a large number of closely spaced teeth on the locking ratchet, even if the operator should by mistake suddenly let go of the handle no harm would be done because the crank would not have opportunity to rotate more than a very few degrees before the dog and ratchet tooth engagement is effective, thereby arresting crank movement and locking the drum in place against rotation.

It will be understood that, whereas in the drawing I have shown a single projection 19, the crank 6 may be made with two such projections to facilitate reversing the crank and applying it to the opposite end of the rod 2. In that event the dog 18 would be removed from one of the projections or ears 19 and would be re-secured to the other one, making a reversible winch actuating structure.

I claim:

1. A winch including a shaft, a support in which it is rotatably mounted, a ratchet rigidly mounted on the support encircling the shaft, a crank arm rigidly mounted on the shaft, a dog pivoted on the crank arm adapted to engage the ratchet, a bell crank lever on the crank arm, a connection between the bell crank lever and the dog and means associated with the dog for yieldingly thrusting it into engagement with the ratchet, a handle slidably and rotatably mounted on the crank arm, a finger lever mounted on the handle for rotation therewith, a connection between the handle and the free end of the bell crank lever, an abutment on the crank arm, a cam on the finger lever adapted when the lever is rotated toward the handle to engage the abutment to laterally displace the handle to rotate the bell crank and release the dog.

2. In combination, a rotating crank, a plurality of fixed abutments adjacent the crank, a movable locking means on the crank and yielding means for forcing it into interlocking position with respect to the abutments, a crank handle mounted for rotation and longitudinal movement on the crank and means responsive to longitudinal displacement of the crank handle for disengaging the locking means and the abutments, a finger lever pivoted on the handle and means including the finger lever responding to angular movement of the finger lever upon the handle for longitudinally displacing the handle along its axis of rotation.

3. A rotatably mounted crank, a plurality of stop means generally concentric with the axis of rotation thereof and adjacent the plane of the crank, an interlocking member on the crank, movable toward and from the stop means, a handle rotatably and slidably mounted on the crank, a connection between the handle and the interlocking member whereby the position of the handle during its longitudinal movement may control the relationship between the stop means and the interlocking member, a collar fixed on the crank, a collar on the handle and a finger lever pivoted thereon, a cam on the finger lever adapted to engage the collar on the crank.

4. A rotatably mounted crank, a plurality of stop means generally concentric with the axis of rotation thereof and adjacent the plane of the crank, an interlocking member on the crank, movable toward and from the stop means, a handle rotatably and slidably mounted on the crank, a connection between the handle and the interlocking member whereby the position of the handle during its longitudinal movement may control the relationship between the stop means and the interlocking member, a collar fixed on the crank, a collar on the handle and a finger lever pivoted thereon, a cam on the finger lever adapted to engage the collar on the crank, the handle being cut away to provide clearance for the cam, the relationship of the two collars and the cam being such that when the finger lever is forced in a direction toward the handle the cam forces the two collars apart to move the handle away from the crank.

FRANK M. THUL.